United States Patent
Sugiyama et al.

(10) Patent No.: US 6,493,211 B1
(45) Date of Patent: Dec. 10, 2002

(54) ELECTROLYTE FOR ELECTROLYTIC CAPACITOR

(75) Inventors: Takayuki Sugiyama, Tokyo (JP); Masashi Ozawa, Tokyo (JP); Hidehiko Itoh, Tokyo (JP); Kenji Tamamitsu, Tokyo (JP); Masao Sakakura, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 09/936,762

(22) PCT Filed: Mar. 17, 2000

(86) PCT No.: PCT/JP00/01667

§ 371 (c)(1),
(2), (4) Date: Sep. 17, 2001

(87) PCT Pub. No.: WO00/55876

PCT Pub. Date: Sep. 21, 2000

(30) Foreign Application Priority Data

| Mar. 17, 1999 | (JP) | 11/072200 |
| Mar. 17, 1999 | (JP) | 11-072201 |
| Mar. 30, 1999 | (JP) | 11/089014 |
| Mar. 30, 1999 | (JP) | 11/089015 |

(51) Int. Cl.$^7$ .................. H01G 6/04; H01G 35/00
(52) U.S. Cl. ............. 361/504; 361/503; 361/511; 361/523; 252/62.2; 29/25.03
(58) Field of Search ................ 361/504, 503, 361/502, 501, 433, 505, 506, 517, 511, 523, 525; 252/62.2; 29/25.03

(56) References Cited

U.S. PATENT DOCUMENTS

| 3,954,673 A | * | 5/1976 | Morimoto | 252/465 |
| 4,469,610 A | * | 9/1984 | Fukuda et al. | 252/62.2 |
| 4,580,194 A | * | 4/1986 | Finkelstein et al. | 361/433 |
| 4,740,869 A | * | 4/1988 | Morimoto et al. | 361/433 |
| 5,055,356 A | * | 10/1991 | Minowa et al. | 428/409 |
| 5,078,845 A | * | 1/1992 | Kunugihara et al. | 205/153 |
| 6,275,371 B1 | * | 8/2001 | Yoshio et al. | |
| 6,285,543 B1 | * | 9/2001 | Komatsu et al. | |
| 6,349,028 B1 | * | 2/2002 | Komatsu | |

FOREIGN PATENT DOCUMENTS

| JP | 8-88147 | 4/1996 |

* cited by examiner

Primary Examiner—Dean A. Reichard
Assistant Examiner—Nguyen Ha
(74) Attorney, Agent, or Firm—Young & Thompson

(57) ABSTRACT

An electrolyte having a high conductivity, an excellent high-temperature life characteristic and leading to improvement of the shelf characteristic of an aluminum electrolytic capacitor. At least one phosphate ion producing compound and a chelating agent are added using a solvent largely composed of water. Therefor, an aluminum electrolytic capacitor comprising such an electrolyte has a low impedance, an excellent high-temperature life characteristic, and an improved shelf characteristic.

9 Claims, No Drawings

ELECTROLYTE FOR ELECTROLYTIC CAPACITOR

INDUSTRIAL FIELD OF APPLICATION

The present invention relates to an electrolytic solution for an electrolytic capacitor.

PRIOR ART

An aluminum electrolytic capacitor generally has the following constitution. Specifically, a high-purity aluminum foil shaped in a strip form is subjected to a surface-enlargement treatment by chemical or electrochemical etching, and the aluminum foil whose surface has been subjected to an enlargement treatment is subjected to a formation treatment in a forming solution, such as an aqueous ammonium borate solution, to prepare an anodic foil comprising the aluminum foil having an oxide film layer formed thereon. Then, the anodic foil is overlapped and wound with a cathodic foil, which is prepared by subjecting a high-purity aluminum foil to a surface-enlargement treatment in a similar manner, via a separator, to prepare a capacitor element. The capacitor element is then dipped in an electrolytic solution for driving and housed in a metallic sheathed package in a closed-end cylindrical form. Further, a sealing member made of elastic rubber is inserted into an open-end section of the sheathed package, and the open-end section of the sheathed package is sealed by drawing, whereby an aluminum electrolytic capacitor is constituted.

As the electrolytic solution impregnated into the capacitor element of a compact aluminum electrolytic capacitor for low voltage, one having ethylene glycol as a main solvent and an ammonium salt of adipic acid, benzoic acid or the like as a solute, one having γ-butyrolactone as a main solvent and a quaternary cyclic amidinium salt of phthalic acid, maleic acid or the like as a solute, and the like have been conventionally known.

Problems that the Invention is to Solve

Applications of the electrolytic capacitor include an electronic apparatus, such as an output smoothing circuit of a switching power supply or the like. While low impedance characteristics are demanded in these applications, such demand is being increased for an electrolytic capacitor along with the progress of miniaturization of the electronic apparatus. The conventional electrolytic solution cannot deal with the demand, and an electrolytic solution having a higher electroconductivity is demanded. The invention is to solve the problem, and one object thereof is to provide an electrolytic solution for an electrolytic capacitor that can realize a low impedance electrolytic capacitor, has a high electro-conductivity, and is excellent in high-temperature service life characteristics.

The conventional aluminum electrolytic capacitor has such problems that, upon allowing to stand, the capacitance is decreased, and the leakage current characteristics are deteriorated, which finally cause opening of a safety valve, and the reliability of the electrolytic capacitor is greatly influenced by the shelf characteristics, which are the characteristics after lapsing a long period of time under load or under no load.

Accordingly, when an aluminum electrolytic capacitor that had been deteriorated by allowing to stand for a long period of time was analyzed, it was found that the pH of the electrolytic solution is increased, and an anionic component, i.e., the solute, was attached to the surface of the electrode foil. It becomes apparent from these facts that aluminum on the surface of the electrode foil is reacted with the anionic component as the solute to attach on the electrode foil, and aluminum is dissolved to form a hydroxide, part of which is reacted with the anionic component as the solute to form a hydrogen gas through the reaction. The reaction is repeated to increase the pH, and finally it brings about deterioration of the electrode foil and opening of the valve.

Meanwhile, it has been well known that phosphoric acid is effective for prevention of the deterioration of an electrode foil, but it is not sufficient. This is because even when phosphoric acid is added, the phosphoric acid thus added is bonded to aluminum in the electrolytic solution to form a water-insoluble complex, and the insoluble complex is attached to the electrode foil, whereby the phosphoric acid is diminished from the electrolytic solution. Furthermore, when the addition amount is too large, such a problem arises that the leakage current is increased. However, the characteristics of the electrolytic capacitor are maintained in good conditions during the period where the phosphate ions remain in an appropriate amount before diminishment thereof, and therefore, the invention has been completed, another object of which is to improve the shelf characteristics of the electrolytic capacitor.

Means for Solving the Problems

The electrolytic solution for an aluminum electrolytic capacitor of the invention is characterized by containing a solvent containing water and a water-soluble aluminum complex having a phosphate ion combined thereto.

The water-soluble aluminum complex having a phosphate ion combined thereto can be formed by adding a compound forming a phosphate ion in an aqueous solution (a phosphate ion forming compound) and a chelating agent forming a water-soluble aluminum complex with aluminum. The phosphate ion forming compound can be selected from the phosphorus compounds described later, phosphoric acid, phosphorous acid, hypophosphorous acid, salts thereof, condensates thereof, and salts of the condensates.

In a preferred embodiment of the invention, at least one kind of adipic acid and a salt thereof is used as the solute.

The solvent contains water as a main component (i.e., in an amount of about 25% or more), and the content of water is generally from 35 to 100% by weight of the entire solvent.

The content of adipic acid or a salt thereof is generally from 5 to 20% by weight of the entire electrolytic solution.

The content of the phosphorus compounds, phosphoric acid, phosphorous acid, hypophosphorous acid, salts thereof, condensates thereof, and salts of the condensates is generally from 0.01 to 3.0% by weight of the entire electrolytic solution.

The content of the chelating agent is generally from 0.01 to 3.0% by weight of the entire electrolytic solution.

Mode for Carrying Out the Invention

The electrolytic solution for an aluminum electrolytic capacitor of the invention is an electrolytic solution, in which the compound forming a phosphate ion in an aqueous solution and the chelating agent are added to the solvent containing water to form a combined product of the water-soluble aluminum complex and a phosphate ion, and after being impregnated in the capacitor element, it reacts with aluminum eluted from the aluminum foil used as the electrode foil to the electrolytic solution, so as to form the combined product of the water-soluble aluminum complex and a phosphate ion.

As the solvent, a protonic polar solvent, an aprotonic solvent and a mixture thereof can be used in addition to water. Examples of the protonic polar solvent include a monohydric alcohol (such as methanol, ethanol, propanol, butanol, hexanol, cyclohexanol, cyclopentanol, benzyl alcohol and the like), a polyhydric alcohol and an oxyalcohol compound (such as ethylene glycol, propylene glycol, glycerin, methyl cellosolve, ethyl cellosolve, 1,3-butanediol, methoxypropylene glycol and the like). Representative examples of the aprotic solvent include an amide series (such as N-methylformamide, N,N-dimethylformamide, N-ethylformamide, N,N-diethylformamide, N-methylacetamide, hexamethylphosphoric amide and the like), a lactone compound, a cyclic amide compound, a carbonate compound (such as γ-butyrolactone, N-methyl-2-pyrrolidone, ethylene carbonate, propylene carbonate and the like), a nitrile compound (such as acetonitrile and the like), an oxide compound (such as dimethyl sulfoxide and the like) and the like.

As the compound forming a phosphate ion in an aqueous solution (the phosphate ion forming compound), the following compounds can be exemplified. They are the phosphorus compounds described later, phosphoric acid, phosphorous acid, hypophosphorous acid, salts thereof, condensates thereof, and salts of the condensates.

Examples of the above-described phosphorus compound and salt thereof include analkyl phosphate, such as ethyl phosphate, diethyl phosphate, butyl phosphate, dibutyl phosphate and the like; a phosphonate and a diphosphonate or a derivative thereof, such as phosphonic acid, 1-hydroxyethylidene-1, 1-diphosphonic acid, aminotrimethylenephosophonic acid, phenylphosphonic acid and the like; a phosphinate, such as methyl phosphinate, butyl phosphinate and the like; and salts of all of them. Among these, are preferred dibutyl phosphate, 1-hydroxyethylidene-1,1-diphosphonic acid, and salts of them. As the salts of the phosphorus compounds, an ammonium salt, an aluminum salt, a sodium salt, a potassium salt, a calcium salt and the like can be used.

A condensed phosphoric acid, which is a condensate of phosphoric acid, and a salt thereof are used. As the condensed phosphoric acid, a linear condensed phosphoric acid, such as pyrophosphoric acid, tripolyphosphoric acid, tetrapolyphosphoric acid and the like, a cyclic condensed phosphoric acid, such as metaphosphoric acid, hexametaphosphoric acid and the like, and a product formed by combining the linear and cyclic condensed phosphoric acids. As the salts of the condensed phosphoric acid, an ammonium salt, an aluminum salt, a sodium salt, a calcium salt, a potassium salt and the like can be used. Among these, are preferred pyrophosphoric acid, tripolyphosphoric acid, tetrapolyphosphoric acid and salts of them, and are more preferred pyrophosphoric acid, tripolyphosphoric acid and salts of them, with tripolyphosphoric acid being most preferred. As the salts of the condensates, an ammonium salt, an aluminum salt, a sodium salt, a potassium salt, a calcium salt and the like can be used.

Furthermore, as the phosphate ion forming compound, phosphoric acid, phosphorous acid, hypophosphorous acid and salts of them can be used. The salts thereof are an ammonium salt, an aluminum salt, a sodium salt, a calcium salt and a potassium salt. Phosphoric acid and a salt thereof form a phosphate ion through decomposition in an aqueous solution. Phosphorous acid, hypophosphorous acid and salts of them form a phosphite ion and a hypophosphite ion through decomposition in an aqueous solution, which then become phosphate ions through oxidation.

As the condensate other than the condensed phosphoric acid, the phosphorus compounds, phosphorous acid, hypophosphorous acid, salts of them, and condensates of the phosphorus compounds, phosphorous acid, hypophosphorous acid and a salt of hypophosphorous acid can be used. Furthermore, salts of the condensates can also be used. As the salts of the condensates, an ammonium salt, an aluminum salt, a sodium salt, a potassium salt, a calcium salt and the like can be used.

These are also the phosphate ion forming compounds, which form a phosphate ion in an aqueous solution or form a phosphite ion or a hypophosphite ion, which then become a phosphate ion through oxidation.

Among these, phosphoric acid or a salt thereof, condensed phosphoric acid, and a derivative of phosphoric acid, such as a phosphate or an alkyl phosphate, which easily form a phosphate ion, are preferred. Further, a linear condensed phosphoric acid. Such as phosphoric acid, pyrophosphoric acid, tri-polyphosophoric acid or the like, which forms a large amount of phosphate ions in a relatively high rate with respect to the addition amount, and a salt thereof are also preferred. In addition to these phosphate ion forming compounds, the effect of the invention can be obtained by substances that form a phosphate ion in an aqueous solution.

The addition amount of the phosphate ion forming compound is from 0.01 to 3.0% by weight, and preferably from 0.2 to 2.0% by weight, of the entire electrolytic solution. The effect is reduced outside the range.

Similarly, the chelating agent forming a water-soluble aluminum complex with aluminum is used as an additive. As the chelating agent, the following can be exemplified. That is, they are an α-hydroxycaboxylic acid, such as citric acid, tartaric acid, gluconic acid, malic acid, lactic acid, glycolic acid, α-hydroxybutylic acid, hydroxymalonic acid, α-methylmalic acid, dihydroxytartaric acid and the like, an aromatic hydroxycarboxylic acid, such as γ-resocylic acid, β-resocylic acid, trihydroxybenzoic acid, hydroxyphthalic acid, dihydroxyphthalic acid, phenoltricarboxylic acid, aluminon, Eriochrome Cyanine R and the like, a sulfocarboxylic acid, such as sulfosalicylic acid and the like, a tannin, such as tannic acid and the like, a guanidine, such as dicyandiamide and the like, a saccharide, such as galactose, glucose and the like, a lignin, such as lignosulfonate and the like, an aminopolycarboxylic acid, such as ethylenediamine-tetraacetic acid (EDTA), nitrilotriacetic acid (NTA), glycolether-diaminetetraacetic acid (GEDTA), diethylenetriamine-pentaacetic acid (DTPA), hydroxyethylethylenediamine-triacetic acid (HEDTA), triethylenetetraminehexaacetic acid (TTHA) and the like, and salts of them. As the salts of them, an ammonium salt, an aluminum salt, a sodium salt, a potassium salt and the like can be used. Among these, are preferred tannic acid, trihydroxybenzoic acid, citric acid, tartaric acid, gluconic acid, aurin tricarboxylic acid, γresocylic acid, DTPA, EDTA, GEDTA, HEDTA, TTHA and salts thereof, which easily exert chelate formation with aluminum, and are more preferred tannic acid, trihydroxybenzoic acid, citric acid, tartaric acid, γ-resocylic acid, aurin tricarboxylic acid, DTPA, GEDTA, HEDTA, TTHA and salts thereof.

The addition amount of the chelating agent is from 0.01 to 3.0% by weight, and preferably from 0.1 to 2.0% by weight, of the entire electrolytic solution. The effect is reduced outside the range.

As the solute of the electrolytic solution for an aluminum electrolytic capacitor used in the invention, an ammonium salt, a quaternary ammonium salt or an amine salt of a carboxylic acid, such as adipic acid, formic acid, benzoic acid and the like, can be used. Examples of a quaternary ammonium constituting the quaternary ammonium salt include a tetraalkylammonium (such as tetramethylammonium, tetraethylammonium, tetrapropylammonium, tetrabutylammonium, methyltriethylammonium, di-methyldiethylammonium and the like) and a pyridinium (such as 1-methylpyridinium, 1-ethylpyridinium, 1,3-diethylpyridinium and the like). Examples of an amine constituting the amine salt include a primary amine (such as methylamine, ethylamine, propylamine, butylamine, ethylenediamine, monoethanolamine and the like), a secondary amine (such as dimethylamine, diethylamine, dipropylamine, ethylmethylamine, diphenylamine, diethanolamine and the like), and a tertiary amine (such as trimethylamine, triethylamine, tributylamine, 1,8-diazabicyclo(5,4,0)-undecene, 7-triethanolamine and the like).

Furthermore, the following acids can be used as the carboxylic acid. They are carboxylic acids including glutaric acid, succinic acid, isophthalic acid, phthalic acid, terephthalic acid, maleic acid, toluic acid, enanthic acid, malonic acid, a decanedicarboxylic acid, such as 1,6-decanedicarboxylic acid, 5,6-decanedicarboxylic acid and the like, an octanedicarboxylic acid, such as 1,7-octanedicarboxylic acid and the like, azelaic acid, sebacic acid and the like. An inorganic acid, such as boric acid, a polyhydric alcohol complex compound of boric acid obtained from boric acid and a polyhydric alcohol, phosphoric acid, carbonic acid, silicic acid and the like, can also be used. Among them, are preferred an organic carboxylic acid, such as a decanedicarboxylic acid, an octanedicarboxylic acid, azelaic acid, sebacic acid, adipic acid, glutaric acid, succinic acid, benzoic acid, isophthalic acid, formic acid and the like, boric acid and a polyhydric alcohol complex compound of boric acid.

A salt having a quaternary cyclic amidinium ion as a cationic component may also be used. Examples of an acid forming an anionic component of the salt include phthalic acid, isophthalic acid, terephthalic acid, maleic acid, benzoic acid, toluic acid, enanthic acid, malonic acid and the like.

The quaternary cyclic amidinium ion as a cationic component is a cation formed by quaternarizing a cyclic compound having an N,N,N'-substituted amidine group, and the following compounds are exemplified as the cyclic compound having an N,N,N'-substituted amidine group. They are an imidazole monocyclic compound (for example, an imidazole homologue, such as 1-methylimidazole, 1-phenylimidazole, 1,2-dimethyl-imidazole, 1-ethyl-2-methylimidazole, 1,2,4-trimethylimidazole and the like, an oxyalkyl derivative, such as 1-methyl-2-oxymethylimidazole, 1-methyl-2-oxyethyl-imidazole and the like, a nitro derivative such as 1-methyl-4(5)-nitroimidazole and the like, an amino derivative such as 1,2-dimethyl-5(4)-aminoimidazole and the like), a benzoimidazole compound (such as 1-methylbenzoimidazole, 1-methyl-2-benzoimidazole, 1-methyl-5(6)-nitrobenzoimidazole and the like), a compound having a 2-imidazoline ring (such as 1-methylimidazoline, 1,2-dimethylimidazoline, 1,2,4-trimethylimidazoline, 1-methyl-2-phenylimidazoline, 1-ethyl-2-methylimidazoline, 1,4-dimethyl-2-ethyl-imidazoline, 1-methyl-2-ethoxymethylimidazoline and the like), a compound having a tetrahydropyrimidine ring (such as 1-methyl-1,4,5,6-tetrahydropyrimidine, 1,2-dimethyl-1,4,5,6-tetrahydropyrimidine, 1,5-diazabicyclo[4,3,0] nonene-5 and the like), and the like.

The aluminum electrolytic capacitor containing the electrolytic solution for an aluminum electrolytic capacitor of the invention described in the foregoing is good in shelf characteristics, i.e., characteristics after a load or no load test for a long period of time, and further the initial capacitance is also increased.

After impregnating a capacitor element with the electrolytic solution for an aluminum electrolytic capacitor of the invention, the chelating agent forms a water-soluble complex with aluminum eluted from the aluminum foil in the electrolytic solution, which forms a combined product through a reaction with a phosphate ion. The combined product is attached to the electrode foil or is dissolved in the electrolytic solution and releases phosphate ions in that state, so as to exert such function that phosphate ions in the electrolytic solution are maintained in a suitable amount. The phosphate ions suppress dissolution of aluminum and formation of a hydroxide of aluminum to suppress deterioration of the electrode foil, whereby the shelf characteristics of the aluminum electrolytic capacitor are improved. The phosphate ions in the electrolytic solution and the phosphate ions in the combined product are detected for a long period of time after allowing to stand in an amount of from 10 to 40,000 ppm in terms of a phosphate radical (the electrolytic solution is diluted with diluted nitric acid of 2 mmol/L to 1,000 times to make pH of from 2 to 3, and phosphate ions are quantitatively determined by an ionic chromatography analysis).

The following experiments clarify these facts. The aluminum electrolytic capacitor of the invention was disassembled, and the electrolytic solution impregnated in the capacitor element was washed and removed. Thereafter, the capacitor element was impregnated with an electrolytic solution containing no phosphate ion to produce an aluminum electrolytic capacitor, and the shelf characteristics of the resulting aluminum electrolytic capacitor were excellent. Phosphate radicals of from 10 to 200 ppm were detected from the electrolytic solution of the aluminum electrolytic capacitor, but substantially no aluminum was detected. That is, the water-soluble complex of the chelating agent and aluminum is combined to phosphate ions to be attached to the electrode foil, and the combined product releases phosphate ions into the electrolytic solution to maintain the suitable phosphate ion concentration for a long period of time, whereby the shelf characteristics of the capacitor are improved.

In the case where the aluminum complex thus formed is not water-soluble, i.e., water-insoluble, the effect of the invention cannot be obtained because it is considered that it has no function of releasing phosphate ions.

In general, when the content of water in the solvent is increased, the presure inside the capacitor is increased due to formation of a hydrogen gas, causing such situation that blister is formed on the package. Particularly, in a high-temperature service life test at 105° C. or higher, when the content of water exceeds 15% by weight, a large amount of gas is formed to increase the pressure inside the capacitor to cause such a situation that the safety valve is opened, and thus, it becomes unusable. That is, the state where the cathodic foil is in contact with the electrolytic solution at a high temperature is continued for a long period of time, and under the presence of a large amount of water, water reaches the aluminum foil through the dense oxide film formed on the aluminum film and reacts with aluminum to form aluminum hydroxide. A hydrogen gas is formed at this time. Furthermore, the reaction suddenly proceeds at a high temperature of 105° C. or higher to form a large amount of gas, and thus, it results in an increase of the inner pressure of the capacitor and opening of the valve of the capacitor.

However, in the electrolytic solution for an aluminum electrolytic capacitor of the invention, because the phosphate ion forming compound and the chelating agent are added to the solvent containing water as a main component as an electrolytic solution, the specific resistance of the electrolytic solution can be reduced, and the impedance of the electrolytic capacitor can be reduced. Furthermore, because the phosphate ion concentration of the electrolytic solution in the capacitor element can be maintained to a suitable amount for a long period of time by the chelating agent, dissolution and deterioration of the electrode foil can be prevented, and the high-temperature service life characteristics of the aluminum electrolytic capacitor can be maintained in an excellent state.

The chelating agent and the phosphate ion forming compound added upon producing the electrolytic solution provide the chelating agent and a phosphate ion in the electrolytic solution of a molar ratio, chelating agent/phosphate ion, of from 1/20 to 3/1. Furthermore, it is preferably from 1/10 to 1/1. When the amount of the chelating agent is smaller than the ratio, the leakage current characteristics of the aluminum electrolytic capacitor are lowered. When it is more than the ratio, the high-temperature service life characteristics of the aluminum electrolytic capacitor are deteriorated although the reasons therefor are not clear.

When a large amount of water is contained in the electrolytic solution, deterioration of the electrode foil becomes remarkable, and in particular, when the content of water in the electrolytic solution exceeds 15%, such problem occurs that deterioration of the characteristics of the aluminum electrolytic capacitor becomes remarkable under the conditions for allowing to stand of 125° C. or higher. In the invention, however, it has been found that the effect is obtained even in the case where a large amount of water is contained, and thus, an aluminum electrolytic capacitor having low impedance characteristics can be obtained by using the electrolytic solution.

That is, an aluminum electrolytic capacitor having low impedance characteristics can be realized by using a solvent containing water as a main component in the electrolytic solution for a aluminum electrolytic capacitor of the invention.

The content of water is generally from 30 to 100% by weight, preferably from 35 to 65% by weight, and more preferably from 55 to 65% by weight, of the entire solvent. The electro-conductivity is lowered outside the range.

As described in the foregoing, in the electrolytic solution for an aluminum electrolytic capacitor of the invention, even when the content of water is 15% by weight or more, an aluminum electrolytic capacitor having excellent high-temperature service life characteristics and withstanding a high-temperature test of 105° C. or higher can be obtained. Furthermore, because the content of water in the solvent can be increased to 100% by weight to obtain an electrolytic solution containing water as a main component, the electroconductivity of the electrolytic solution can be increased to obtain an aluminum electrolytic capacitor having low impedance characteristics.

Furthermore, it can be used at 125° C. when the content of water is 65% by weight or more. Therefore, the range where it has a high electroconductivity and can be used at 125° C. is from 55 to 65% by weight. In the case where the phosphate ion forming compound and the chelating agent, which are used as additives in the invention, are used singly within the range of the content of water of 65% by weight or lower, there are some cases where it withstands the service life test at 105° C., but it suffers from opening of the valve in the initial stage on the high-temperature service life test of 125° C. or higher. However, it can be used at 125° C. owing to the synergistic effect between the phosphate ion forming compound and the chelating agent.

Furthermore, in the conventional aluminum electrolytic capacitor using an electrolytic solution containing water, the leakage current is increased after a high-temperature no load test, but in the aluminum electrolytic capacitor using the electrolytic solution for an aluminum electrolytic capacitor of the invention, the increase of the leakage current is small, and the change of tan δ after the high-temperature test is smaller than the conventional product, whereby the high-temperature service life characteristics are improved.

As described in the foregoing, the content of water in the solvent can be increased to 100% by weight by adding the phosphate ion forming compound and the chelating agent to the solvent containing water as a main component, whereby an electrolytic solution having a high electroconductivity can be obtained, blister and opening of the valve in the package of the capacitor are prevented, and the tan δ and the leakage current characteristics after the high-temperature test are improved. Accordingly, the invention realizes an electrolytic capacitor having impedance characteristics and high-temperature service life characteristics, which cannot be found in the conventional art, owing to the synergistic effect among the solvent containing water as a main component, the phosphate ion forming compound and the chelating agent.

The electrolytic solution for an aluminum electrolytic capacitor of the invention using the solvent containing water as a main component does not suffer from such problem as ignition even in the case where the capacitor is broken down upon using under non-standard conditions, such as use at high voltage. Other components than the solvent are the phosphoric, acid forming compound and the chelating agent, and therefore the components constituting the electrolyte have high safety. It is thus excellent in environmental resistance.

The impedance is further decreased by using at least one kind of adipic acid and a salt thereof as the solute.

The content of adipic acid or a salt thereof is from 5 to 20% by weight, and preferably from 9 to 16% by weight, in the electrolytic solution. The electroconductivity is decreased when it is less than the range, and the solubility is decreased when it exceeds the range. The content of other solute is also about from 5 to 20% by weight, and preferably about from 9 to 16% by weight, in the entire electrolytic solution.

Furthermore, an improvement of the voltage resistance can be attained by adding boric acid, mannitol, a nonionic surfactant, colloidal silica and the like to the electrolytic solution for an electrolytic capacitor of the invention.

By using the electrolytic solution for an aluminum electrolytic capacitor of the invention, such aluminum electrolytic capacitor can be obtained that is excellent in impedance characteristics and further, in high-temperature service life characteristics.

The invention will be described more specifically below with reference to the Examples.

EXAMPLES

The invention will be described in detail with reference to First Example. The capacitor element is formed by rolling up an anodic foil and a cathodic foil with a separator intervening therebetween. The anodic foil used is one obtained in such a manner that an aluminum foil of a purity of 99.9% is subjected to chemical or electrochemical etching in an acidic solution to enhance the surface area thereof and then subjected to a chemical treatment in an ammonium adipate aqueous solution, so as to form an anodic oxide film layer on the surface thereof. The cathodic foil used is an aluminum foil of a purity of 99.9% having been subjected to etching to enhance the surface area thereof.

The capacitor element thus constituted in the foregoing manner is impregnated with an electrolytic solution for driving an electrolytic capacitor. The capacitor element impregnated with the electrolytic solution is housed in an aluminum cylindrical outer package with a bottom, a sealing member formed with butyl rubber is inserted into an open end of the outer package, and further, the open end of the outer package is sealed by drawing to seal the aluminum electrolytic capacitor.

The compositions and the characteristics of the electrolytic solutions used herein are shown in Tables 1-1 and 1-2.

The aluminum electrolytic capacitors thus constituted were subjected to a high-temperature service life test. The rating of the aluminum electrolytic capacitors is 50 WV-100 μF. The test conditions are at 125° C. with load of the rated voltage for 1,000 hours, and at 125° C. with no load for 1,000 hours for Examples 1-1 to 1-11, Conventional Example 1-1, and Comparative Examples 1-1 and 1-2, and at 105° C. with load of the rated voltage for 1,000 hours, and at 105° C. with no load for 1,000 hours for Examples 1-2 and 1-3, Conventional Example 1-2, and Comparative Example 1-3, with the respective results being shown in Tables 1-3 to 1-6 and Tables 1-7 and 1-8.

TABLE 1-1

|  | Water | EG | AAd | TRPA | ACTR | Specific resistance (Ωcm) |
|---|---|---|---|---|---|---|
| Example 1-1 | 30(35) | 56 | 12.0 | 1.0 | 1.0 | 89 |
| Example 1-2 | 47(55) | 39 | 12.0 | 1.0 | 1.0 | 42 |
| Example 1-3 | 52(60) | 34 | 12.8 | 0.2 | 1.0 | 31 |
| Example 1-4 | 52(60) | 34 | 12.9 | 1.0 | 0.1 | 31 |
| Example 1-5 | 53(60) | 36 | 9.0 | 1.0 | 1.0 | 39 |
| Example 1-6 | 52(60) | 34 | 12.0 | 1.0 | 1.0 | 32 |
| Example 1-7 | 49(60) | 33 | 16.0 | 1.0 | 1.0 | 30 |
| Example 1-8 | 52(60) | 34 | 11.0 | 1.0 | 2.0 | 33 |
| Example 1-9 | 52(60) | 34 | 11.0 | 2.0 | 1.0 | 33 |

(Note)
EG: Ethylene glycol
AAd: Ammonium adipate
TRPA: Tripolyphosphoric acid
ACTR: Ammonium citrate
The parenthetic numerals in the column for water are the contents of water in the solvent.

TABLE 1-2

|  | Water | EG | AAd | PRPA | TRPA | ACTR | AGLC | Specific resistance (Ωcm) |
|---|---|---|---|---|---|---|---|---|
| Example 1-10 | 52(60) | 34 | 12.0 | — | 1.0 | — | 1.0 | 31 |
| Example 1-11 | 52(60) | 34 | 12.0 | 1.0 | — | 1.0 | — | 32 |
| Example 1-12 | 65(75) | 21 | 12.0 | — | 1.0 | 1.0 | — | 24 |
| Example 1-13 | 86(100) | — | 12.0 | — | 1.0 | 1.0 | — | 16 |
| Conventional Example 1-1 | 5(5) | 93 | 7.0 | — | — | — | — | 248 |
| Conventional Example 1-2 | 9(10) | 77 | 14 | — | — | — | — | 172 |
| Comparative Example 1-1 | 9(10) | 77 | 13.0 | — | — | 1.0 | — | 175 |
| Comparative Example 1-2 | 9(10) | 77 | 13.0 | — | 1.0 | — | — | 173 |
| Comparative Example 1-3 | 13(15) | 73 | 14 | — | — | — | — | 129 |

(Note)
PRPA: Pyrophosphoric acid
AGLC: Ammonium gluconate
The parenthetic numerals in the column for water are the contents of water in the solvent.

TABLE 1-3

|  | Initial characteristics | | | Load at 125° C. for 1,000 hr | | |
|---|---|---|---|---|---|---|
|  | Cap | tan δ | LC | ΔCap | tan δ | LC |
| Example 1-1 | 102 | 0.030 | 2.13 | −6.1 | 0.096 | 1.49 |
| Example 1-2 | 103 | 0.020 | 1.88 | −6.2 | 0.032 | 1.45 |
| Example 1-3 | 103 | 0.020 | 1.93 | −6.3 | 0.030 | 1.46 |
| Example 1-4 | 103 | 0.020 | 1.90 | −6.2 | 0.029 | 1.56 |

TABLE 1-3-continued

|  | Initial characteristics | | | Load at 125° C. for 1,000 hr | | |
| --- | --- | --- | --- | --- | --- | --- |
|  | Cap | tan δ | LC | ΔCap | tan δ | LC |
| Example 1-5 | 103 | 0.020 | 1.99 | -6.6 | 0.032 | 1.51 |
| Example 1-6 | 103 | 0.019 | 1.93 | -6.4 | 0.029 | 1.54 |
| Example 1-7 | 103 | 0.019 | 1.92 | -6.3 | 0.030 | 1.52 |

(Note)

Cap: Capacitance (μF)

tan δ: Tangent of dielectric loss

LC: Leakage current (μA)

ΔCap: Change rate of capacitance (%)

TABLE 1-4

|  | Initial characteristics | | | Load at 125° C. for 1,000 hr | | |
| --- | --- | --- | --- | --- | --- | --- |
|  | Cap | tan δ | LC | ΔCap | tan δ | LC |
| Example 1-8 | 103 | 0.020 | 1.91 | -6.3 | 0.027 | 1.40 |
| Example 1-9 | 103 | 0.020 | 1.90 | -6.2 | 0.030 | 1.40 |
| Example 1-10 | 103 | 0.020 | 1.93 | -6.5 | 0.029 | 1.44 |
| Example 1-11 | 103 | 0.019 | 1.93 | -6.2 | 0.028 | 1.54 |
| Conventional Example 1-1 | 101 | 0.063 | 2.03 | -7.3 | 0.232 | 1.54 |
| Comparative Example 1-1 | 102 | 0.043 | 1.90 | Valve opened | | |
| Comparative Example 1-2 | 102 | 0.044 | 1.88 | Valve opened | | |

TABLE 1-5

|  | Initial characteristics | | | Load at 125° C. for 1,000 hr | | |
| --- | --- | --- | --- | --- | --- | --- |
|  | Cap | tan δ | LC | ΔCap | tan δ | LC |
| Example 1-1 | 102 | 0.029 | 2.13 | -8.5 | 0.128 | 13.0 |
| Example 1-2 | 103 | 0.020 | 2.00 | -7.9 | 0.027 | 12.0 |
| Example 1-3 | 103 | 0.020 | 1.90 | -7.2 | 0.029 | 15.3 |
| Example 1-4 | 104 | 0.019 | 2.03 | -7.1 | 0.028 | 15.5 |
| Example 1-5 | 103 | 0.020 | 1.98 | -8.1 | 0.029 | 14.8 |
| Example 1-6 | 103 | 0.020 | 2.04 | -7.2 | 0.026 | 15.0 |
| Example 1-7 | 103 | 0.019 | 1.91 | -8.2 | 0.027 | 15.3 |

TABLE 1-6

|  | Initial characteristics | | | Load at 125° C. for 1,000 hr | | |
| --- | --- | --- | --- | --- | --- | --- |
|  | Cap | tan δ | LC | ΔCap | tan δ | LC |
| Example 1-8 | 104 | 0.021 | 2.00 | -7.3 | 0.030 | 13.0 |
| Example 1-9 | 103 | 0.019 | 2.00 | -7.3 | 0.028 | 14.5 |
| Example 1-10 | 103 | 0.020 | 1.86 | -7.4 | 0.029 | 12.3 |
| Example 1-11 | 103 | 0.020 | 1.90 | -7.2 | 0.028 | 12.0 |
| Conventional Example 1-1 | 101 | 0.065 | 2.22 | -8.8 | 0.313 | 103 |
| Comparative Example 1-1 | 101 | 0.045 | 1.99 | Valve opened | | |
| Comparative Example 1-1 | 101 | 0.044 | 2.03 | Valve opened | | |

TABLE 1-7

|  | Initial characteristics | | | Load at 125° C. for 1,000 hr | | |
| --- | --- | --- | --- | --- | --- | --- |
|  | Cap | tan δ | LC | ΔCap | tan δ | LC |
| Example 1-12 | 104 | 0.019 | 2.05 | -4.8 | 0.021 | 1.59 |
| Example 1-13 | 103 | 0.017 | 1.98 | -4.8 | 0.022 | 1.50 |
| Conventional Example 1-2 | 103 | 0.045 | 1.89 | -4.2 | 0.063 | 1.59 |
| Comparative Example 1-3 | 103 | 0.038 | 1.92 | Valve opened | | |

TABLE 1-8

|  | Initial characteristics | | | Load at 125° C. for 1,000 hr | | |
| --- | --- | --- | --- | --- | --- | --- |
|  | Cap | tan δ | LC | ΔCap | tan δ | LC |
| Example 1-12 | 103 | 0.018 | 2.05 | -6.1 | 0.021 | 14.1 |
| Example 1-13 | 103 | 0.016 | 1.95 | -6.1 | 0.021 | 14.7 |
| Conventional Example 1-2 | 103 | 0.045 | 1.88 | -5.1 | 0.069 | 85.1 |
| Comparative Example 1-3 | 104 | 0.037 | 1.91 | Valve opened | | |

It is clear from Tables 1-1 to 1-8 that, in Examples 1-1 to 1-13 having contents of water in the solvent of from 35 to 100% by weight, the electrolytic solution has a low specific resistance and a low tan δ in the initial stage in comparison to the Conventional Examples. The change of tan δ after the high-temperature test is also small. Furthermore, the leakage current after the high-temperature no load test is remarkably small in comparison to the Conventional Examples. In the results of the high-temperature test at 105° C. shown in Tables 1-7 and 1-8, good results are obtained in Examples 1-12 and 1-13 having high contents of water of from 75 to 100% by weight, whereas Comparative Example 1–3 not using the condensed phosphoric acid and the chelating agent suffers from opening of the valve even in the test period of several tens of hours regardless of the low content of water of 15% by weight, and thus the effect of the condensed phosphoric acid and the chelating agent in the invention is understood. Furthermore, in the high-temperature test at 125° C. shown in Tables 1-3 to 1-6, good results are obtained in Examples 1-1 to 1-11 having contents of water of from 35 to 60% by weight, whereas in Comparative Examples 1-1 and 1-2 using one of the condensed phosphoric acid or the chelating agent singly, they suffer from opening of the valve even in the test period of several tens of hours regardless of the low content of water of 10% by weight, and thus, the strong synergistic effect between the condensed phosphoric acid and the chelating agent in the invention is understood.

The equivalent initial characteristics and service life characteristics are obtained in Examples 1-5, 1-6 and 1-7 having contents of ammonium adipate of 9.0, 12.0 and 14.0% by weight, Examples 1-3, 1-6 and 1-9 having contents of tripolyphosphoric acid of 0.2, 1.0 and 2.0% by weight, and Examples 1-4, 1-6 and 1–8 having contents of ammonium citrate of 0.1, 1.0 and 2.0% by weight, and thus, it is understood that excellent characteristics are obtained within the ranges.

The invention will be described in detail with reference to Second Example. Electrolytic capacitors were produced in the same manner as in the First Example.

The compositions and the characteristics of the electrolytic solutions used herein are shown in Tables 2-1 and 2-2.

The aluminum electrolytic capacitors thus constituted were subjected to a high-temperature service life test. The rating of the aluminum electrolytic capacitors is 50 WV-100 μF. The test conditions are at 125° C. with load of the rated voltage for 1,000 hours, and at 125° C. with no load for 1,000 hours for Examples 2-1 to 2-11, Conventional Example 2-1, and Comparative Examples 2-1 and 2-2, and at 105° C. with load of the rated voltage for 1,000 hours, and at 105° C. with no load for 1,000 hours for Examples 2-12 and 2-13, Conventional Example 2-2, and Comparative Example 2-3, with the respective results being shown in Tables 2-3 to 2-6 and Tables 2-7 and 2-8.

TABLE 2-1

|  | Water | EG | AAd | TRPA | ACTR | Specific resistance (Ωcm) |
|---|---|---|---|---|---|---|
| Example 2-1 | 30(35) | 56 | 12.0 | 1.0 | 1.0 | 88 |
| Example 2-2 | 47(55) | 39 | 12.0 | 1.0 | 1.0 | 43 |
| Example 2-3 | 52(60) | 34 | 12.8 | 0.2 | 1.0 | 31 |
| Example 2-4 | 52(60) | 34 | 12.9 | 1.0 | 0.1 | 31 |
| Example 2-5 | 53(60) | 36 | 9.0 | 1.0 | 1.0 | 39 |
| Example 2-6 | 52(60) | 34 | 12.0 | 1.0 | 1.0 | 31 |
| Example 2-7 | 49(60) | 33 | 16.0 | 1.0 | 1.0 | 30 |
| Example 2-8 | 52(60) | 34 | 11.0 | 1.0 | 2.0 | 33 |
| Example 2-9 | 52(60) | 34 | 11.0 | 2.0 | 1.0 | 33 |

(Note)
EC: Ethylene glycol
AAd: Ammonium adipate
DBP: Dibutyl phosphate
ACTR: Ammonium citrate
The parenthetic numerals in the column for water are the contents of water in the solvent.

TABLE 2-2

|  | Water | EG | AAd | DBP | HEDP | ACTR | AGLC | Specific resistance (Ωcm) |
|---|---|---|---|---|---|---|---|---|
| Example 2-10 | 52(60) | 34 | 12.0 | — | 1.0 | — | 1.0 | 32 |
| Example 2-11 | 52(60) | 34 | 12.0 | 1.0 | — | 1.0 | — | 31 |
| Example 2-12 | 65(75) | 21 | 12.0 | — | 1.0 | 1.0 | — | 23 |
| Example 2-13 | 86(100) | — | 12.0 | — | 1.0 | 1.0 | — | 15 |
| Conventional Example 2-1 | 5(5) | 93 | 7.0 | — | — | — | — | 248 |
| Conventional Example 2-2 | 9(10) | 77 | 14 | — | — | — | — | 172 |
| Comparative Example 2-1 | 9(10) | 77 | 13.0 | — | — | 1.0 | — | 175 |
| Comparative Example 2-2 | 9(10) | 77 | 13.0 | — | 1.0 | — | — | 173 |
| Comparative Example 2-3 | 13(15) | 73 | 14 | — | — | — | — | 129 |

(Note)
HEDP: 1-Hydroxyethylidene-1,1-diphosphoric acid
AGLC: Ammonium gluconate
The parenthetic numerals in the column for water are the contents of water in the solvent.

TABLE 2-3

|  | Initial characteristics | | | Load at 125° C. for 1,000 hr | | |
|---|---|---|---|---|---|---|
|  | Cap | tan δ | LC | ΔCap | tan δ | LC |
| Example 2-1 | 103 | 0.029 | 2.11 | −6.1 | 0.094 | 1.45 |
| Example 2-2 | 103 | 0.020 | 1.79 | −6.2 | 0.031 | 1.48 |
| Example 2-3 | 102 | 0.021 | 1.88 | −6.2 | 0.029 | 1.42 |
| Example 2-4 | 103 | 0.021 | 1.89 | −6.3 | 0.030 | 1.49 |
| Example 2-5 | 103 | 0.020 | 1.95 | −6.5 | 0.031 | 1.53 |
| Example 2-6 | 102 | 0.019 | 1.92 | −6.3 | 0.030 | 1.51 |
| Example 2-7 | 103 | 0.020 | 1.91 | −6.4 | 0.029 | 1.49 |

(Note)
Cap: Capacitance (μF)
tan δ: Tangent of dielectric loss

TABLE 2-3-continued

|  | Initial characteristics | | | Load at 125° C. for 1,000 hr | | |
|---|---|---|---|---|---|---|
|  | Cap | tan δ | LC | ΔCap | tan δ | LC |

LC: Leakage current (μA)
ΔCap: Change rate of capacitance (%)

TABLE 2-4

|  | Initial characteristics | | | Load at 125° C. for 1,000 hr | | |
|---|---|---|---|---|---|---|
|  | Cap | tan δ | LC | ΔCap | tan δ | LC |
| Example 2-8 | 102 | 0.019 | 1.90 | −6.2 | 0.026 | 1.39 |
| Example 2-9 | 103 | 0.020 | 1.91 | −6.1 | 0.029 | 1.41 |
| Example 2-10 | 103 | 0.021 | 1.92 | −6.4 | 0.030 | 1.42 |
| Example 2-11 | 102 | 0.019 | 1.94 | −6.3 | 0.029 | 1.53 |
| Conventional Example 2-1 | 101 | 0.063 | 2.03 | −7.3 | 0.232 | 1.54 |
| Comparative Example 2-1 | 102 | 0.043 | 1.90 | Valve opened | | |
| Comparative Example 2-2 | 102 | 0.044 | 1.88 | Valve opened | | |

TABLE 2-5

|  | Initial characteristics | | | Load at 125° C. for 1,000 hr | | |
|---|---|---|---|---|---|---|
|  | Cap | tan δ | LC | ΔCap | tan δ | LC |
| Example 2-1 | 103 | 0.030 | 2.09 | −8.3 | 0.125 | 13.3 |
| Example 2-2 | 103 | 0.021 | 2.03 | −7.7 | 0.028 | 12.2 |
| Example 2-3 | 102 | 0.019 | 1.92 | −7.1 | 0.030 | 15.1 |
| Example 2-4 | 104 | 0.020 | 2.02 | −7.2 | 0.027 | 15.8 |
| Example 2-5 | 103 | 0.020 | 1.95 | −8.3 | 0.028 | 14.5 |
| Example 2-6 | 102 | 0.019 | 2.03 | −7.3 | 0.025 | 15.2 |
| Example 2-7 | 103 | 0.020 | 1.89 | −8.1 | 0.028 | 15.1 |

TABLE 2-6

| | Initial characteristics | | | Load at 125° C. for 1,000 hr | | |
|---|---|---|---|---|---|---|
| | Cap | tan δ | LC | ΔCap | tan δ | LC |
| Example 2-8 | 103 | 0.020 | 2.03 | −7.2 | 0.029 | 13.2 |
| Example 2-9 | 103 | 0.018 | 2.09 | −7.1 | 0.027 | 14.3 |
| Example 2-10 | 104 | 0.021 | 1.91 | −7.3 | 0.028 | 12.5 |
| Example 2-11 | 103 | 0.020 | 1.88 | −7.3 | 0.029 | 12.2 |
| Conventional Example 2-1 | 101 | 0.065 | 2.22 | −8.8 | 0.313 | 103 |
| Comparative Example 2-1 | 101 | 0.045 | 1.99 | Valve opened | | |
| Comparative Example 2-2 | 101 | 0.044 | 2.03 | Valve opened | | |

TABLE 2-7

| | Initial characteristics | | | Load at 125° C. for 1,000 hr | | |
|---|---|---|---|---|---|---|
| | Cap | tan δ | LC | ΔCap | tan δ | LC |
| Example 2-12 | 103 | 0.020 | 2.09 | −4.7 | 0.022 | 1.55 |
| Example 2-13 | 104 | 0.018 | 1.95 | −4.9 | 0.021 | 1.51 |
| Conventional Example 2-2 | 103 | 0.045 | 1.89 | −4.2 | 0.063 | 1.59 |
| Comparative Example 2-3 | 103 | 0.038 | 1.92 | Valve opened | | |

TABLE 2-8

| | Initial characteristics | | | Load at 125° C. for 1,000 hr | | |
|---|---|---|---|---|---|---|
| | Cap | tan δ | LC | ΔCap | tan δ | LC |
| Example 2-12 | 102 | 0.018 | 2.03 | −6.2 | 0.020 | 14.3 |
| Example 2-13 | 103 | 0.017 | 1.92 | −6.0 | 0.020 | 14.5 |
| Conventional Example 2-2 | 103 | 0.045 | 1.88 | −5.1 | 0.069 | 85.1 |
| Comparative Example 2-3 | 104 | 0.037 | 1.91 | Valve opened | | |

It is clear from Tables 2-1 to 2-8 that, in Examples 2-1 to 2-13 having contents of water in the solvent of from 35 to 100% by weight, the electrolytic solution has a low specific resistance and a low tan δ in the initial stage in comparison to the Conventional Examples. The change of tan δ after the high-temperature test is also small. Furthermore, the leakage current after the high-temperature no load test is remarkably small in comparison to the Conventional Examples. In the results of the high-temperature test at 105° C. shown in Tables 2-7 and 2-8, good results are obtained in Examples 2-12 and 2-13 having high contents of water of from 75 to 100% by weight, whereas Comparative Example 2-3 not using the phosphorus compound and the chelating agent suffers from opening of the valve even in the test period of several tens of hours regardless of the low content of water of 15% by weight, and thus, the effect of the phosphorus compound and the chelating agent in the invention is understood. Furthermore, in the high-temperature test at 125° C. shown in Tables 2-3 to 2-6, good results are obtained in Examples 2-1 to 2-11 having contents of water of from 35 to 60% by weight, whereas in Comparative Examples 2-1 and 2-2 using one of the phosphorus compound or the chelating agent singly, they suffer from opening of the valve even in the test period of several tens of hours regardless of the low content of water of 10% by weight, and thus, the strong synergistic effect between the phosphorus compound and the chelating agent in the invention is understood.

The equivalent initial characteristics and service life characteristics are obtained in Examples 2-5, 2-6 and 2-7 having contents of ammonium adipate of 9.0, 12.0 and 14.0% by weight, Examples 2-3, 2-6 and 2-9 having contents of dibutyl phosphate of 0.2, 1.0 and 2.0% by weight, and Examples 2-4, 2-6 and 2-8 having contents of ammonium citrate of 0.1, 1.0 and 2.0% by weight, and thus, it is understood that excellent characteristics are obtained within the ranges.

The invention will be described in detail with reference to Third Example. Electrolytic capacitors were produced in the same manner as in the First Example.

The compositions of the electrolytic solutions used herein were 52 parts of water, 34 parts of ethylene glycol and 14 parts of ammonium adipate, to which the additives shown in Table 3-1 were added. As Comparative Example 3-3, an electrolytic solution having 26 parts of water, 60 parts of ethylene glycol and 14 parts of ammonium adipate and containing no additive was produced. Table 3-1 also shows the specific resistance thereof.

The aluminum electrolytic capacitors thus constituted were subjected to a service life test. The rating of the aluminum electrolytic capacitors is 6.3 WV-5,600 μF. The test conditions are at 105° C. with load of the rated voltage or no load for 1,000 hours. As for Examples 3-1, 3-2 and 3-7, it was also carried out at 125° C. with load of the rated voltage or no load for 1,000 hours. The electric characteristics after the test are shown in Tables 3-2 to 3-5.

TABLE 3-1

| | DTPA | GEDTA | TTHA | TaA | GaA | PRPA | DBP | 2PA | Specific resistance (Ωcm) |
|---|---|---|---|---|---|---|---|---|---|
| Example 3-1 | 1 | — | — | — | — | 1 | — | — | 28 |
| Example 3-2 | 1 | — | — | — | — | — | 2 | — | 31 |
| Example 3-3 | — | 1 | — | — | — | 1 | — | — | 28 |
| Example 3-4 | — | — | 1 | — | — | 1 | — | — | 29 |
| Example 3-5 | — | — | — | 1 | — | 1 | — | — | 28 |
| Example 3-6 | — | — | — | — | 1 | 1 | — | — | 29 |
| Example 3-7 | 1 | — | — | — | — | — | — | 1 | 28 |
| Example 3-8 | — | 1 | — | — | — | — | — | 1 | 29 |
| Example 3-9 | — | — | 1 | — | — | — | — | 1 | 29 |
| Comparative Example 3-1 | — | — | — | — | — | — | — | 0.005 | 26 |

TABLE 3-1-continued

|  | DTPA | GEDTA | TTHA | TaA | GaA | PRPA | DBP | 2PA | Specific resistance (Ωcm) |
|---|---|---|---|---|---|---|---|---|---|
| Comparative Example 3-2 | — | — | — | — | — | — | — | 1 | 27 |
| Comparative Example 3-3 | — | — | — | — | — | — | — | — | 80 |

(Note)
DTPA: Diethylenetriaminepentaacetic acid
GEDTA: Glycoletherdiaminetetraacetic acid
TTHA: Triethylenetetraminehexaacetic acid
TaA: Tannic acid
GaA: 3,4,5- Trihydroxybenzoic acid (gallic acid)
PRPA: Pyrophosphoric acid
DBP: Dibutyl phosphate
2AP: Diammonium hydrogenphosphate

TABLE 3-2

|  | Initial characteristics | | | Load at 125° C. for 1,000 hr | | |
|---|---|---|---|---|---|---|
|  | Cap | tan δ | LC | ΔCap | tan δ | LC |
| Example 3-1 | 5,710 | 0.060 | 17 | −11 | 0.071 | 14 |
| Example 3-2 | 5,690 | 0.060 | 15 | −11 | 0.070 | 16 |
| Example 3-3 | 5,680 | 0.061 | 18 | −10 | 0.070 | 15 |
| Example 3-4 | 5,650 | 0.060 | 19 | −11 | 0.069 | 14 |
| Example 3-5 | 5,680 | 0.061 | 15 | −10 | 0.070 | 16 |
| Example 3-6 | 5,680 | 0.060 | 16 | −11 | 0.071 | 14 |
| Example 3-7 | 5,700 | 0.060 | 16 | −10 | 0.070 | 15 |
| Example 3-8 | 5,680 | 0.061 | 15 | −10 | 0.069 | 12 |
| Example 3-9 | 5,640 | 0.059 | 18 | −12 | 0.073 | 16 |
| Comparative Example 3-1 | 5,600 | 0.060 | 15 | Valve opened | | |
| Comparative Example 3-2 | 5,610 | 0.061 | 35 | Valve opened | | |
| Comparative Example 3-3 | 5,610 | 0.109 | 14 | Valve opened | | |

(Note)
Cap: Capacitance (μF)
tan δ: Tangent of dielectric loss
LC: Leakage current (μA)
ΔCap: Change rate of capacitance (%)

TABLE 3-3

|  | Initial characteristics | | | Load at 125° C. for 1,000 hr | | |
|---|---|---|---|---|---|---|
|  | Cap | tan δ | LC | ΔCap | tan δ | LC |
| Example 3-1 | 5,700 | 0.060 | 16 | 12 | 0.072 | 36 |
| Example 3-2 | 5,700 | 0.061 | 14 | −12 | 0.074 | 39 |
| Example 3-3 | 5,680 | 0.060 | 18 | −11 | 0.071 | 240 |
| Example 3-4 | 5,640 | 0.059 | 18 | −10 | 0.069 | 318 |
| Example 3-5 | 5,690 | 0.061 | 15 | −10 | 0.070 | 29 |
| Example 3-6 | 5,680 | 0.061 | 17 | −11 | 0.071 | 28 |
| Exampe 3-7 | 5,710 | 0.060 | 15 | −12 | 0.071 | 31 |
| Example 3-8 | 5,680 | 0.061 | 13 | −11 | 0.070 | 195 |
| Example 3-9 | 5,640 | 0.059 | 18 | −11 | 0.071 | 221 |
| Comparative Example 3-1 | 5,600 | 0.060 | 12 | Valve opened | | |
| Comparative Example 3-2 | 5,600 | 0.061 | 42 | Valve opened | | |
| Comparative Example 3-3 | 5,600 | 0.110 | 16 | Valve opened | | |

TABLE 3-4

|  | Initial characteristics | | | Load at 125° C. for 1,000 hr | | |
|---|---|---|---|---|---|---|
|  | Cap | tan δ | LC | ΔCap | tan δ | LC |
| Example 3-1 | 5,700 | 0.062 | 18 | −21 | 0.071 | 12 |
| Example 3-2 | 5,710 | 0.062 | 16 | −22 | 0.072 | 14 |
| Example 3-7 | 5,700 | 0.061 | 14 | −20 | 0.071 | 12 |

TABLE 3-5

|  | Initial characteristics | | | Load at 125° C. for 1,000 hr | | |
|---|---|---|---|---|---|---|
|  | Cap | tan δ | LC | ΔCap | tan δ | LC |
| Example 3-1 | 5,700 | 0.061 | 15 | −23 | 0.076 | 32 |
| Example 3-2 | 5,700 | 0.062 | 18 | −22 | 0.074 | 41 |
| Example 37 | 5,690 | 0.061 | 14 | −21 | 0.075 | 29 |

As it is understood from Tables 3-2 to 3-5, the service life characteristics at 105° C. and 125° C. after 1,000 hours of the Examples were excellent. The capacitance in the initial stage is also high. In comparison to these, Comparative Examples 3-1 and 3-2 having only diammonium hydrogenphosphate added suffer from opening of the valve even though 0.005 part and 1 part, respectively, of diammonium hydrogenphosphate are added to the electrolytic solutions, and the leakage current in the initial stage is high in Comparative Example 3-2 having 1 part of diammonium hydrogenphosphate added.

Furthermore, Comparative Example 3-3 having neither chelating agent nor diammonium hydrogenphosphate added has a specific resistance of 80 and a tan δ of from 0.109 to 0.110, which are in the lowest level as the conventional products, but suffers from opening of the valve, and therefore, it is understood that the invention realizes an electrolytic capacitor, which has low tan δ characteristics that are not conventionally attained and has good high-temperature service life characteristics.

Advantage of the Invention:

The phosphoric acid compound and the chelating agent are added to the solvent containing water as a main component in the electrolytic solution for an electrolytic capacitor in the invention, and therefore, the content of water can be increased to 100% by weight of the solvent, so as to obtain a high electroconductivity of the electrolytic solution. Furthermore, blister and opening of the valve of the capacitor are prevented, and the tan δ characteristics after the high-temperature test and the leakage current characteristics after the high-temperature no load test are also improved. As described in the foregoing, an electrolytic capacitor having impedance characteristics and high-temperature service life characteristics that are not conventionally attained, and improved shelf characteristics can be realized owing to the synergistic effect among the solvent containing water as a main component, the phosphoric acid compound and the chelating agent in the electrolytic solution for an electrolytic capacitor of the invention.

What is claimed is:

1. An electrolytic solution for an aluminum electrolytic capacitor containing a solvent containing water in an amount of 35 to 100% by weight of the entire solvent and a water-soluble aluminum complex having a phosphate ion combined thereto.

2. An electrolytic solution for an aluminum electrolytic capacitor according to claim 1, wherein said solvent contains water as a main component.

3. An electrolytic solution for an aluminum electrolytic capacitor according to claim 1, wherein said water-soluble aluminum complex having a phosphate ion combined thereto is formed by adding a compound forming a phosphate ion in an aqueous solution and a chelating agent forming a water-soluble aluminum complex with aluminum.

4. An electrolytic solution for an aluminum electrolytic capacitor according to claim 3, wherein said compound forming a phosphate ion in an aqueous solution is at least one kind selected from the group consisting of phosphoric acid, phosphorous acid, hypophosphorous acid or salts thereof; a phosphate or an alkylphosphate, a phosphonate, a diphosphonate or a derivative thereof, a phosphinate, or a salt thereof; and a condensate thereof or a salt of said condensate.

5. An electrolytic solution for an aluminum electrolytic capacitor according to claim 1, wherein at least one kind of adipic acid and a salt thereof is used as a solute.

6. An electrolytic solution for an aluminum electrolytic capacitor according to claim 5, wherein a content of adipic acid or a salt thereof is from 5 to 20% by weight of the entire electrolytic solution.

7. An electrolytic solution for an aluminum electrolytic capacitor according to claim 3, wherein a content of said compound forming a phosphate ion in an aqueous solution is from 0.01 to 3.0% by weight of the entire electrolytic solution.

8. An electrolytic solution for an aluminum electrolytic capacitor according to claim 3, wherein a content of said chelating agent is from 0.01 to 3.0% by weight of the entire electrolytic solution.

9. An electrolytic solution for an aluminum electrolytic capacitor according to claim 3, wherein said chelating agent is at least one kind selected from the group consisting of citric acid, tartaric acid, gluconic acid, malic acid, lactic acid, glycolic acid, α-hydroxybutylic acid, hydroxymalonic acid, α-methylmalic acid, dihydroxytartaric acid, γ-resocylic acid, β-resocylic acid, trihydroxybenzoic acid, hydroxyphthalic acid, dihydroxyphthalic acid, phenoltricarboxylic acid, aluminon, Eriochrome Cyanine R, sulfosalicylic acid, tannic acid, dicyandiamide, galactose, glucose, lignosulfonate, ethylenediaminetetraacetic acid (EDTA), nitrilotriacetic acid (NTA), glycoletherdiaminetetraacetic acid (GEDTA), di-ethylenetriaminepentaacetic acid (DTPA), hydroxyethyl-ethylenediaminetriacetic acid (HEDTA), triethylene-tetraminehexaacetic acid (TTHA), and salts of them.

* * * * *